(12) United States Patent
Arulf et al.

(10) Patent No.: US 11,667,409 B2
(45) Date of Patent: Jun. 6, 2023

(54) SEPARATION DEVICE (71) Applicant: RUAG SPACE AB, Gothenburg (SE)

(72) Inventors: Örjan Arulf, Linköping (SE); Johan Öhlin, Rimforsa (SE); Magnus Thenander, Linköping (SE)

(73) Assignee: RUAG SPACE AB, Gothenburg (SE)

( * ) Notice: Subject to any disclaimer, the term of this patent is extended or adjusted under 35 U.S.C. 154(b) by 335 days.

(21) Appl. No.: 16/955,122

(22) PCT Filed: Dec. 21, 2017

(86) PCT No.: PCT/SE2017/051331
§ 371 (c)(1),
(2) Date: Jun. 18, 2020

(87) PCT Pub. No.: WO2019/125257
PCT Pub. Date: Jun. 27, 2019

(65) Prior Publication Data
US 2020/0307835 A1 Oct. 1, 2020

(51) Int. Cl.
*B64G 1/64* (2006.01)
*F16B 37/08* (2006.01)

(52) U.S. Cl.
CPC .......... *B64G 1/645* (2013.01); *F16B 37/0864* (2013.01)

(58) Field of Classification Search
CPC .......... B64G 1/641; B64G 1/645; B64G 1/64; F16B 37/08; F16B 37/0864
USPC .................................. 411/267, 433
See application file for complete search history.

(56) References Cited

U.S. PATENT DOCUMENTS

| | | | |
|---|---|---|---|
| 3,302,960 A * | 2/1967 | Herrmann | F16B 21/165 403/325 |
| 3,334,536 A | 8/1967 | Armstrong | |
| 5,221,171 A | 6/1993 | Rudoy et al. | |
| 5,248,233 A | 9/1993 | Webster | |
| 5,722,709 A | 3/1998 | Lortz et al. | |

(Continued)

FOREIGN PATENT DOCUMENTS

| | | |
|---|---|---|
| CN | 105667839 A | 6/2016 |
| EP | 3184439 A1 | 6/2017 |

OTHER PUBLICATIONS

Extended European Search Report dated Jun. 28, 2021 for European Patent Application No. 17935774.4, 7 pages.

(Continued)

*Primary Examiner* — Magdalena Topolski
*Assistant Examiner* — Shanna Danielle Glover
(74) *Attorney, Agent, or Firm* — Sage Patent Group (57) ABSTRACT

A separation device for a spacecraft or launcher comprising a nut divided into at least two nut portions locked to each other by a locking device in a locking position. A releasing device is arranged to switch the locking device from the locking position to a releasing position. The separation device comprises at least two bearing elements arranged between the locking device and the nut. The nut comprises an outer envelope surface which comprises as many indentations as the number of bearing elements and locking surfaces between the indentations. In the locked state each bearing element is jammed between the locking surface and an inner envelope surface of the locking device and in the released state each bearing element is positioned facing the indentations.

15 Claims, 8 Drawing Sheets

(56) References Cited

U.S. PATENT DOCUMENTS

| | | | |
|---|---|---|---|
| 5,755,544 A | | 5/1998 | Muller et al. |
| 6,033,169 A | * | 3/2000 | Bettger ............... F16B 37/0857 |
| | | | 411/270 |
| 6,352,397 B1 | * | 3/2002 | O'Quinn ................ B64G 1/645 |
| | | | 411/270 |
| 6,433,990 B1 | | 8/2002 | Rudoy et al. |
| 6,769,830 B1 | * | 8/2004 | Nygren ................. F16B 41/002 |
| | | | 29/446 |
| 2003/0128491 A1 | | 7/2003 | Bueno Ruiz et al. |
| 2013/0101369 A1 | | 4/2013 | Lenoir et al. |
| 2015/0300788 A1 | | 10/2015 | Ahlqvist et al. |
| 2016/0290323 A1 | | 10/2016 | Cassanelli |

OTHER PUBLICATIONS

PCT International Search Report and Written Opinion dated Aug. 30, 2018 for PCT/SE2017/051331, 13 pages.

\* cited by examiner

SEPARATION DEVICE

CROSS-REFERENCE TO RELATED APPLICATIONS

This application is a 35 U.S.C. § 371 national stage application for WIPO Patent Office Application No.: PCT/SE2017/051331, entitled "A SEPARATION DEVICE", filed on Dec. 21, 2017, the disclosures and contents of which are hereby incorporated by reference in their entireties.

TECHNICAL FIELD

A separation device for a spacecraft or launcher. The separation device comprises a nut divided into at least two nut portions locked to each other by a locking device in a locking position. The locking device is arranged to move relative the nut between the locking position and a releasing position. The separation device comprises a releasing device connected to the locking device. The releasing device is arranged to switch the locking device from the locking position to the releasing position when the separation device is switched from the locked state to the released state.

BACKGROUND

Separation devices generate relatively high levels of shock when activated. This shock comes from different internal sources (depending on device design) such as initiator activation and bolt strain energy release. The main contributor is however the internal locking device impact when the locking device moves from the locking position to the releasing position. A payload such as a satellite is mounted onto a dispenser body which is launched by a launcher spacecraft into space. The payload is mounted to the dispenser body by separation devices arranged to release the payload at a certain position in space. It is crucial that the separation devices are separated exactly when intended to, since there will be no second chance in space to make a faulty separation successful. In order to safeguard release the separation devices are equipped with forceful initiators. Furthermore, all parts of the spacecraft, e.g. the payload and the dispenser, are designed to have as low weight as possible. The material is therefore carefully chosen to allow as thin and lightweight constructions as possible balancing on the edge of construction safety margins.

The shock generated by the separation device is problematic for the spacecraft, payload and dispenser bodies. This problem is usually greater for smaller spacecraft due to more restricted packing volume and shorter distance between shock source and equipment.

There is thus a need for an improved separation device.

SUMMARY

An object of the present disclosure is to provide a separation device for a payload in a spacecraft or launcher according to the appended claims where the previously mentioned problems are avoided. This object is at least partly achieved by the features of the independent claims. The dependent claims contain further developments of the separation device.

The separation device comprises a separation device for a spacecraft or launcher. The separation device comprises a nut divided into at least two nut portions locked to each other by locking means in a locking position. The locking means is arranged to move relative the nut between a locking position and a releasing position thereby unlocking the nut.

In the locking position, the locking device is engaging the nut by the locking means and thereby hindering the at least two nut portions from separating. In the releasing position the locking device has been moved into a position where the locking means are disengaged and the at least two nut portions can separate.

The separation device comprises a releasing device connected to the locking device. The releasing device is arranged to switch the locking device from the locking position to the releasing position when the separation device is switched from the locked state to the released state. The separation device comprises at least two bearing elements arranged between the locking device and the nut. The nut comprises an outer envelope surface which comprises as many indentations as the number of bearing elements and locking surfaces between the indentations.

In the locked state each bearing element is jammed between the locking surface and an inner envelope surface of the locking device hindering movement of the nut portions in a radial direction.

In order to facilitate the description of the invention the device is sometimes described using cylindrical coordinates where the radial direction points from the centre of the nut and essentially perpendicular to a longitudinal direction coinciding with a centre axis of the nut.

The locking surfaces are advantageously arranged such that the bearing elements can apply a balanced pressure onto the nut from different directions. It should be noted that there are as many locking surfaces as the number of bearing elements and there are as many indentations as bearing elements. In order to get the balanced pressure, the number of bearing elements should be at least an equal amount of bearing elements per locking surface and then at least one per locking surface. The bearing elements are advantageously positioned symmetrically around the nut to get a balanced pressure. For example, should the number of nut portions be two, then the number of locking surfaces is at least two and the number of bearing elements is at least two positioned on either side of the nut and opposite each other. Should the number of bearing elements be more than two, then the bearing elements are positioned such that one bearing element on one locking surface has a counterpart bearing element on another locking surface. According to another example, the nut comprises three nut portions and then at least three locking surfaces correspondingly. The number of bearing elements is in this case at least three and evenly distributed accordingly. Should the number of bearing elements be six, then the number of indentations would be six, and the number of locking surfaces would be six accordingly with two locking surfaces per nut portion.

When the number of nut portions are odd, then the balanced pressure can be achieved without the bearing elements being positioned opposite each other with reference to a centrum point of the nut if there is an even distribution of the bearing elements. When the number of nut portions are even, then the balanced pressure is achieved by bearing elements being positioned opposite each other with reference to the centrum point of the nut. If the number of bearing elements is one per locking surface and there is only one locking surface per nut portion, then the bearing element is positioned in the middle of the nut portion to get an even pressure of the nut portions towards each other. If the number of bearing elements is more than one per locking surface, then the bearing elements are positioned evenly distributed over the locking surface with relation to the middle of the nut portion to get an even pressure of the nut portions towards each other.

It should be noted that the nut portions can be equal in size or be different in size. The geometrical distribution of the bearing elements is dependent on number of nut portions, size of the nut portions and number of bearing elements and follow known rules of force geometry.

In the released state each bearing element is positioned facing the indentations thereby allowing movement of the nut portions in the radial direction.

According to one example, the bearing elements are directly or indirectly stored in the locking device such that the bearing elements follow the rotational movement of the locking device. Here directly stored relates to that the locking device comprises guiding means that brings the bearing elements along during movement of the locking device. Here, indirect relates to that a separate guiding means is connected to the locking device such that the bearing elements are brought along during movement of the locking device. In both cases, the guiding means comprises holding means formed and arranged to move the bearing elements with as little friction as possible.

According to one example, the holding means comprises protrusions arranged in the radial direction with an extension being partly or entirely of the same length as the size of a cross-section of a bearing element. According to one example, the length of the protrusions exceed the radius of the bearing element which gives a pressure point against the bearing element in conjunction with a centrum axis of the bearing point. The advantage of such a centrally position pressure point is that the bearing elements is subject to a balanced force that follows the path of movement of the locking device. A protrusion being shorter than the radius of the bearing element is also possible but there is a risk of a force vector pointing in a counter radial direction, i.e. towards the centre of the nut, that may knock out the bearing element from the holding means. The protrusions can be straight or curved. A curved protrusion can be shaped to follow the curvature of the envelope surface of the bearing element. According to one example the holding means comprises upper holding means and lower holding means that encompasses the bearing elements partly or entirely. This has the advantage that the bearing elements are kept in position regardless of if other portions of the guiding and holding means apply forces in a counter radial direction. According to this example, the bearing elements have an extension in the longitudinal direction being longer than that part of the nut portions that comprises the indentations. Hence, the bearing elements have a length in the longitudinal direction being at least the length of that part of the nut portions that comprises the indentations plus the length of the upper and lower holding means. The upper holding means and lower holding means that encompasses the bearing elements partly or entirely would otherwise hinder the radial movement of the nut portions. The portion of the guiding and holding means between the upper holding means and lower holding means advantageously has as little extension as possible in the radial direction in order to allow movement of the nut portions such that the indentations can receive the bearing elements without interference of the guiding and holding means. It should be noted that the nut has portions not comprising indentations, and those portions can have a length in the longitudinal direction exceeding that part of the nut portions that comprises the indentations. For example, the nut portions may comprise protrusions that can be used for allowing a controlled sliding of the nut portions in the radial direction. According to another example, the nut portions may comprise wedge shaped portions used to hold the nut portions in place in the released portion.

In prior art it is known that the shock generated when the separation device goes from a locking position to a releasing position is problematic for the spacecraft, payload and dispenser bodies. The present invention has the advantage that the force is directed essentially in a plane perpendicular to the longitudinal direction, i.e. in a radial plane, since the locking device is brought to move in a rotational manner in the radial plane when going from the locking position to the releasing position.

A further advantage with the invention is that the indentations in the nut portions allows for arrangements that gives an uneven distribution of force against the nut portions when the locking device moves from the locking position to the releasing position. The uneven distribution of force knocks the nut portions out from their position and removes problem with jamming of the nut portions in the tight nut formation and longitudinally extending forces in a fastening structure holding a fastening device in the nut in the locked state. According to one example, the fastening structure is threads and the fastening device is a bolt. The threaded bolt exerts force both in the radial direction, which is a good thing when the separation device is in a released state, but also in the longitudinal direction which may cause jamming of the nut portions towards each other via the threads.

The uneven force distribution can be achieved in a number of ways. According to one example, the indentations can be unevenly distributed over the nut portions which gives the effect that the evenly distributed bearing elements reaches the indentations at different points during the movement of the fastening device. According to one example, the indentations can have different radii which also gives the advantage of uneven force distribution since one bearing element reaching an indentation with one radius applies one force and another bearing element reaching an indentation with another radius applies another force. According to one example, the uneven force distribution is achieved by arranging the indentations unevenly distributed and with different radii.

It should also be noted that the chosen radius has an additional positive effect that can eliminate shock, i.e. sudden change in force, in the transition when the bearing elements goes from applying maximum force onto the nut portions, i.e. in the locking position, to applying less force onto the nut portions, i.e. in the releasing position. A smooth radius gives a smooth transition. Here, smooth relates to a very small curvature starting from the locking surface, which curvature increases in a direction from the locking surface into the indentation.

Hence, according to one example the indentations have a smooth curvature from the locking surface to the bottom of the indentation to attenuate a peak load when the separation device is switched from the locked state to the released state.

Here, "attenuate a peak load" or "chock peak attenuation" refers to a process of lowering an energy peak being an effect of switching the separation device from a locked state to a released state. Such transformation involves releasing a relatively large amount of energy at a short time interval and the energy must be high enough to secure separation. Should the energy peak be too high with relation to adjoining sensitive structures then the chock wave from the separation device could be harmful for the adjoining sensitive structures. The invention removes the problem with such energy peaks by directing the energy in a rotational direction in a plane essentially perpendicular to extension of the bolt.

According to one example, the bearing elements are in the form of cylindrical elements. According to one example, the bearing elements are in the form of spherical elements. According to another example, the bearing elements are in the form of cylindrical elements and spherical elements.

According to one example, the separation device comprises a housing comprising an outer housing in which the locking device is stored for rotation.

According to one example, the housing comprises an inner housing to which the nut is connected for hindering rotation of the nut relative the housing. The inner housing is positioned within the outer housing and attached to the outer housing via an end plate.

According to one example, the nut is slidably stored in the inner housing for allowing a slidable motion of the nut portions in a radial direction relative the inner housing. According to one example, at least two nut portions comprise protrusions and the end plate comprises mating recesses or groves in which the protrusions can slide. According to one example, the end plate comprises protrusions and at least two nut portions comprise mating recesses or groves in which the protrusions can slide. According to one example, the end plate comprises at least one protrusion and at least one recess/groove and at least one nut portion comprises a recess/grove that mates the protrusion and at least one nut portion comprises a protrusion that mates the recess/groove. Regardless of the above examples, there are as many protrusions as there are recesses/grooves. However, each of the protrusions may comprise a number of spaced protrusions According to one example, the locking device is rotatably arranged between the locking position and the releasing position within the outer housing and about the inner housing.

The separation device comprises a control unit arranged to initiate the releasing device from the locking position to the releasing position. The control unit can be either part of the separation device structure or connected to the separation device via a fixed line or vi a remote and wireless interface. Such control units and interfaces are long known in prior art.

According to one example, the separation device comprises an pressure device to be stored in a locking position and move to a releasing position when the separation device is switched from the locked state to the released state. When the separation device is used for securing a device, for example the payload, to another object, for example the dispenser body, then a fastening means, for example a bolt, is arranged within the nut. The nut is then arranged with threads to which the bolt are threaded into. The bolt then also has corresponding outer threads. When the separation device is switched from the locked state to the released state, the locking device moves from the locking position to the releasing position allowing for the at least two nut portions to separate.

The pressure device comprises a casing that houses the spring. The spring is arranged between the flanges and the wedge shaped portions of the pressure device. Hence, in the releasing position the spring puts pressure against the wedge shaped portions of the pressure device which in turn puts pressure against the wedge shaped portions of the nut. One effect of this is aiding in separating the nut portions. Another effect is that the nut portions are held in place in the releasing position.

According to one example, the pressure device is directly controlled by the control unit via mechanical or electrical means. According to another example, the pressure device is indirectly controlled by the control unit and is initiated by the movement of the locking device and has a mechanical or electrical connection to the locking device that releases the pressure device from the locking state to the releasing state.

According one example, the releasing device is a pre-tensioned spring and/or a pre-loaded device that releases the energy upon initiation causing the locking device to rotate. Examples of such pre-loaded devices are pneumatic or pyrotechnic units. The releasing device can also be a in the form of a motor that drives the rotation of the locking device. According to one example, the motor can be an electrically driven motor. According to one example, the releasing device is a paraffin driven actuator.

BRIEF DESCRIPTION OF DRAWINGS

The disclosure will be described in greater detail in the following, with reference to the attached drawings, in which;

FIG. 1 schematically shows a side view of a separation device according to the disclosure in a locking position, FIG. 2 schematically shows a cross-section along the line A-A in FIG. 1, where the separation device is in a locking position, FIG. 3 schematically shows a cross-section along the line A-A in FIG. 1, where the separation device is between a locking position and a releasing position, FIG. 4 schematically shows a cross-section along the line A-A in FIG. 1, where the separation device is in a releasing position, FIG. 5 schematically shows a cross-section along the line A-A in FIG. 1, where the separation device is in a releasing position, FIG. 6 schematically shows a cross-section along the line A-A in FIG. 1, where the separation device is in a releasing position, FIG. 7 schematically shows a cross-section of a nut and bearing elements along the line A-A in FIG. 1, and wherein;

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
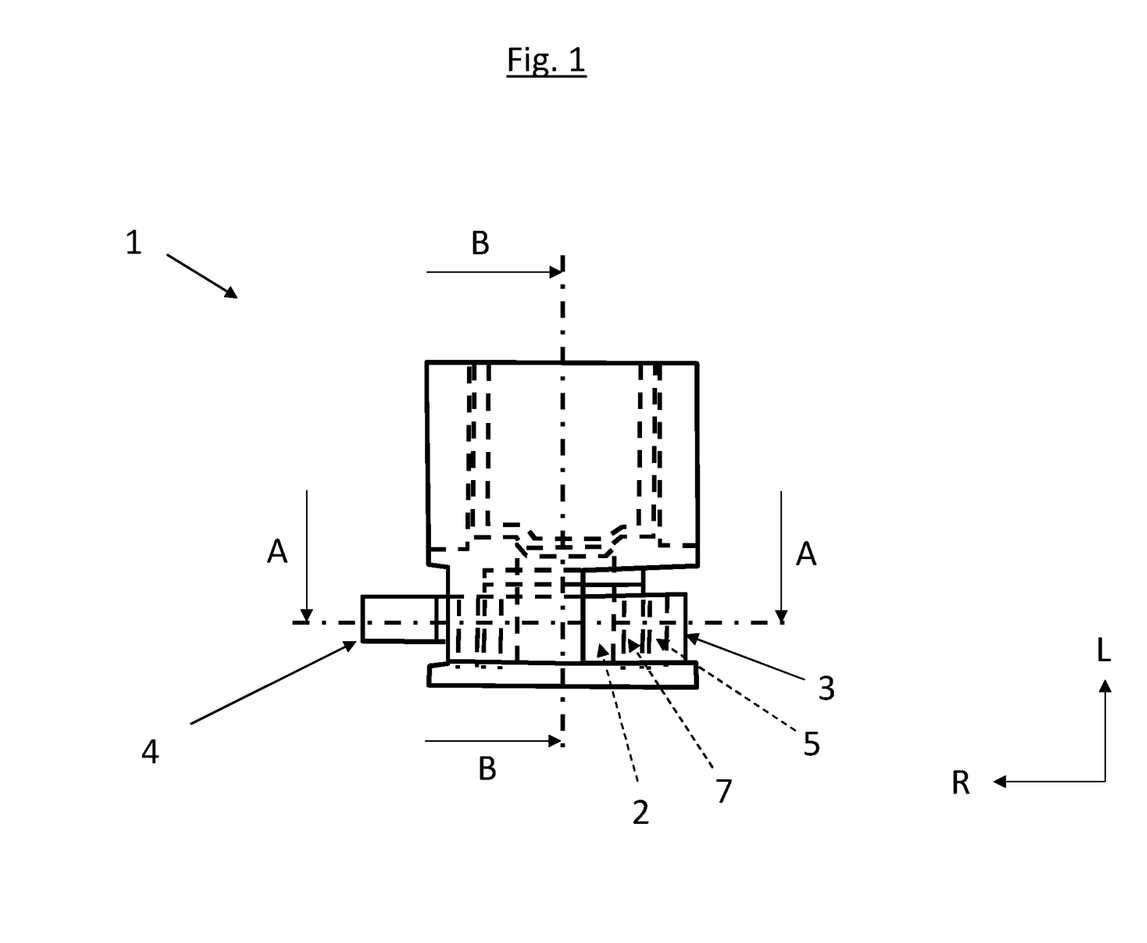

FIG. 1 schematically shows a side view of a separation device 1 for a spacecraft or launcher according to the disclosure in a locking position. The separation device 1 comprises a nut 2 divided into at least two nut portions 2a, 2b, 2c, see FIGS. 2-7, locked to each other by a locking device 3 in a locking position. The locking device 3 is arranged to move relative the nut 2 between the locking position and a releasing position. The separation device 1 comprises a releasing device 4 connected to the locking device 3. The releasing device 4 is arranged to switch the locking device 3 from the locking position to the releasing position when the separation device 1 is switched from the locked state to the released state.

Figure 2:
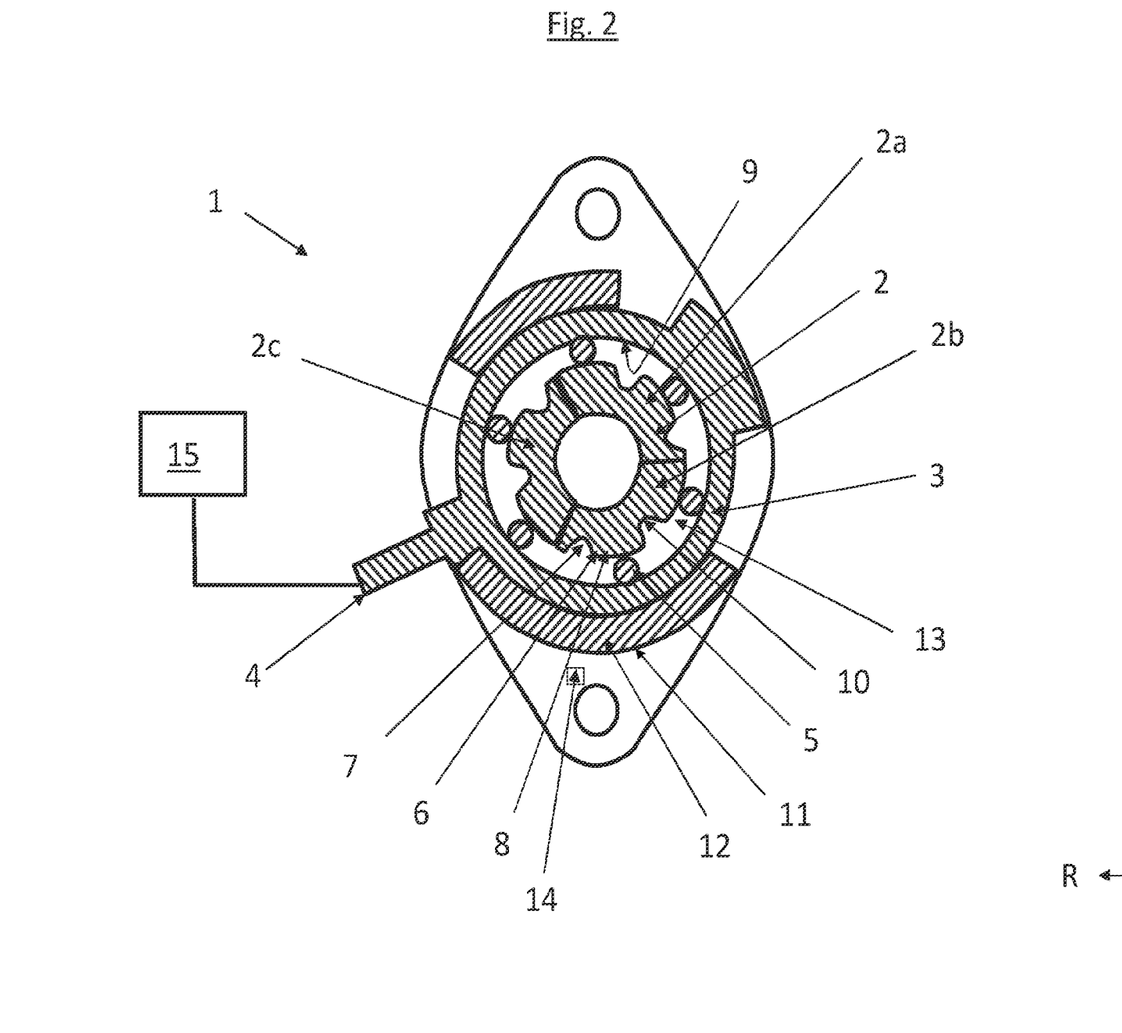

FIG. 2 schematically shows a cross-section along the line A-A in FIG. 1, where the separation device is in a locking position. FIG. 2 shows that the separation device 1 comprises a nut 2 divided into three nut portions 2a, 2b, 2c locked to each other by the locking device 3 in the locking position. The locking device 3 being arranged to move relative the nut 2 between the locking position shown in FIG. 2 and the releasing position shown in FIG. 4. FIGS. 2-8 shows that the separation device 1 comprises a releasing device 4 connected to the locking device 3 and that the releasing device 4 is arranged to switch the locking device 3 from the locking position to the releasing position when the separation device 1 is switched from the locked state to the released state. FIGS. 2-8 shows that the separation device 1 comprises at least two bearing elements 5 arranged between the locking device and the nut 2. The nut 2 comprises an outer envelope surface 6 which comprises as many indentations 7 as the number of bearing elements 5 and a corresponding number of locking surfaces 8 between the indentations 7. FIGS. 2-8 shows three nut portions 2a, 2b, 2c, three locking surfaces 8, two indentations 7 per nut portion 2a, 2b, 2c and a corresponding number of bearing elements 5 as indentations 7. It should be noted that the number of nut portions can be less than three and more than three, but at least two. The number of indentations is at least one per nut portion 2a, 2b, 2c and the number of bearing elements 5 is equal to the number of indentations 7.

FIG. 2 shows that in the locked state each bearing element 5 is jammed between the locking surface 8 and an inner envelope surface 9 of the locking device 3 hindering movement of the nut portions 2a, 2b, 2c in a radial direction.

FIGS. 1-8 shows that the bearing elements 5 are in the form of cylindrical elements, but bearing elements can be in the form of spherical elements or a combination of cylindrical elements and spherical elements.

Figure 3:
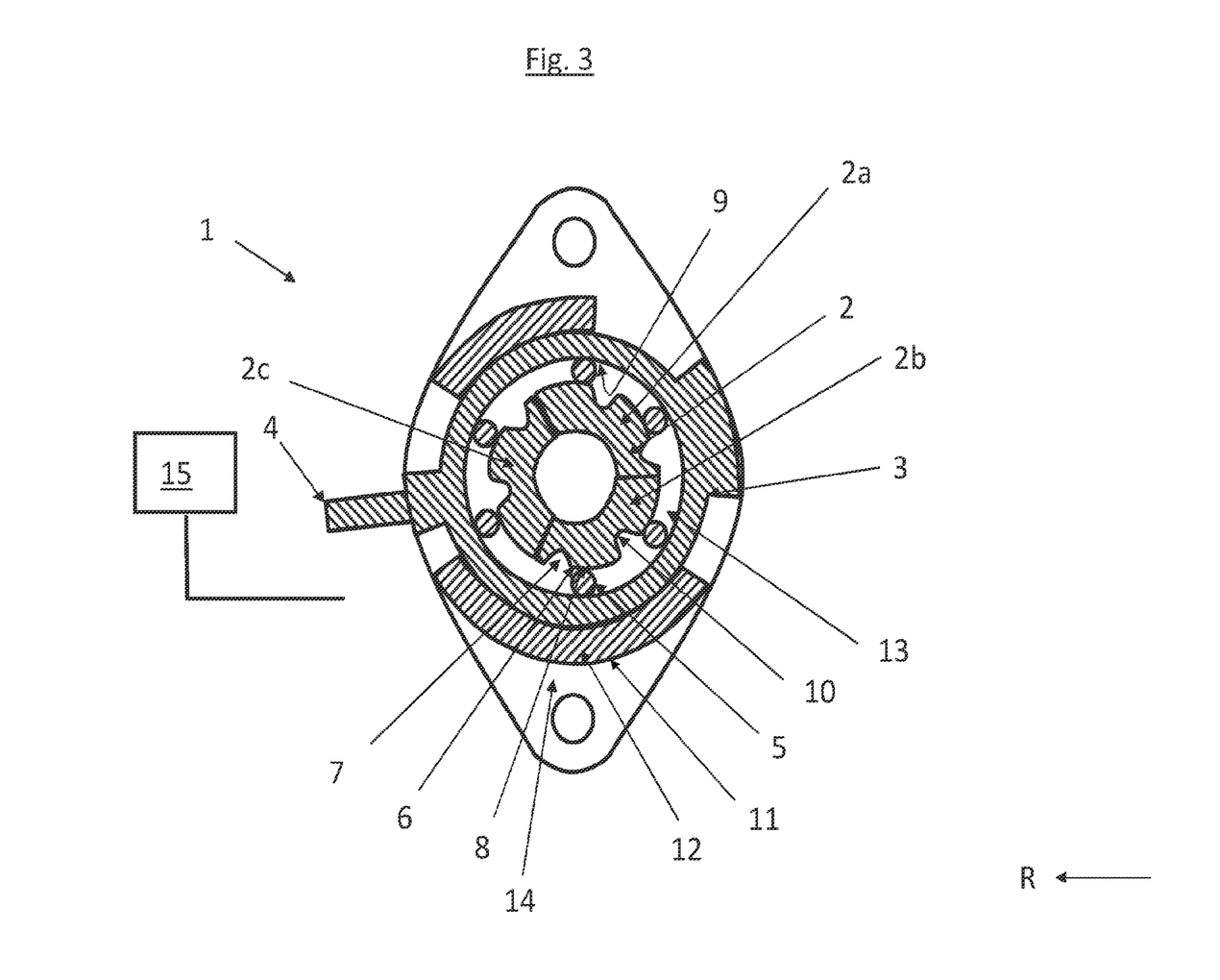

FIG. 3 schematically shows a cross-section along the line A-A in FIG. 1, where the separation device 1 is between the locking position and the releasing position, i.e. in a transition state.

Figure 4:
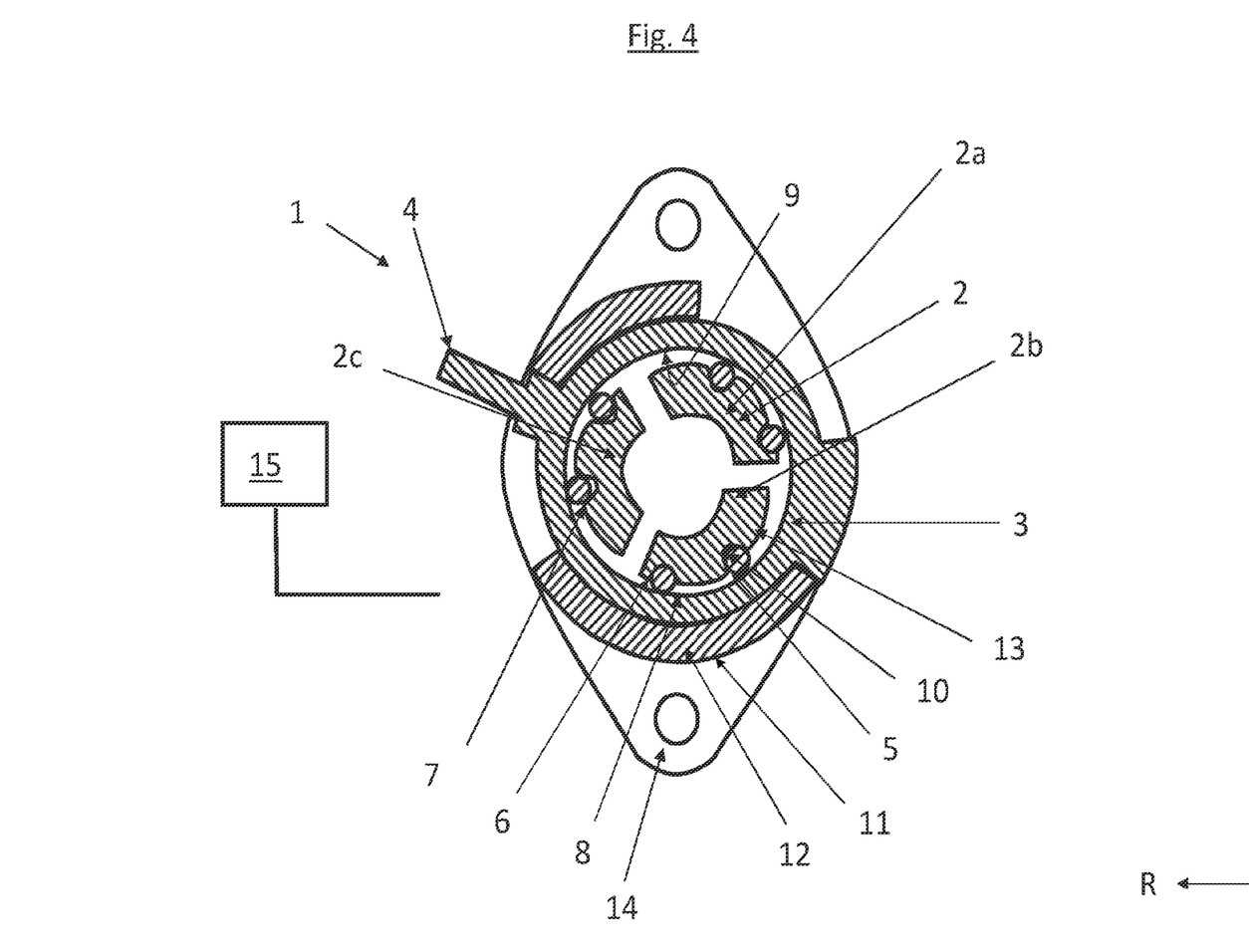

FIG. 4 schematically shows a cross-section along the line A-A in FIG. 1, where the separation device is in the releasing position, i.e. in the release state, where each bearing element 5 is positioned facing the indentations 7 thereby allowing movement of the nut portions 2a, 2b, 2c in the radial direction R.

As can be seen from FIGS. 2-4, the separation device 1 is arranged to switch the locking device 3 from the locking position to the releasing position via rotation of the locking device 3 in a plane coinciding with the radial direction.

FIGS. 1-6 shows that the separation device 1 comprises a control unit 15 arranged to initiate the releasing device 4.

Figure 5:
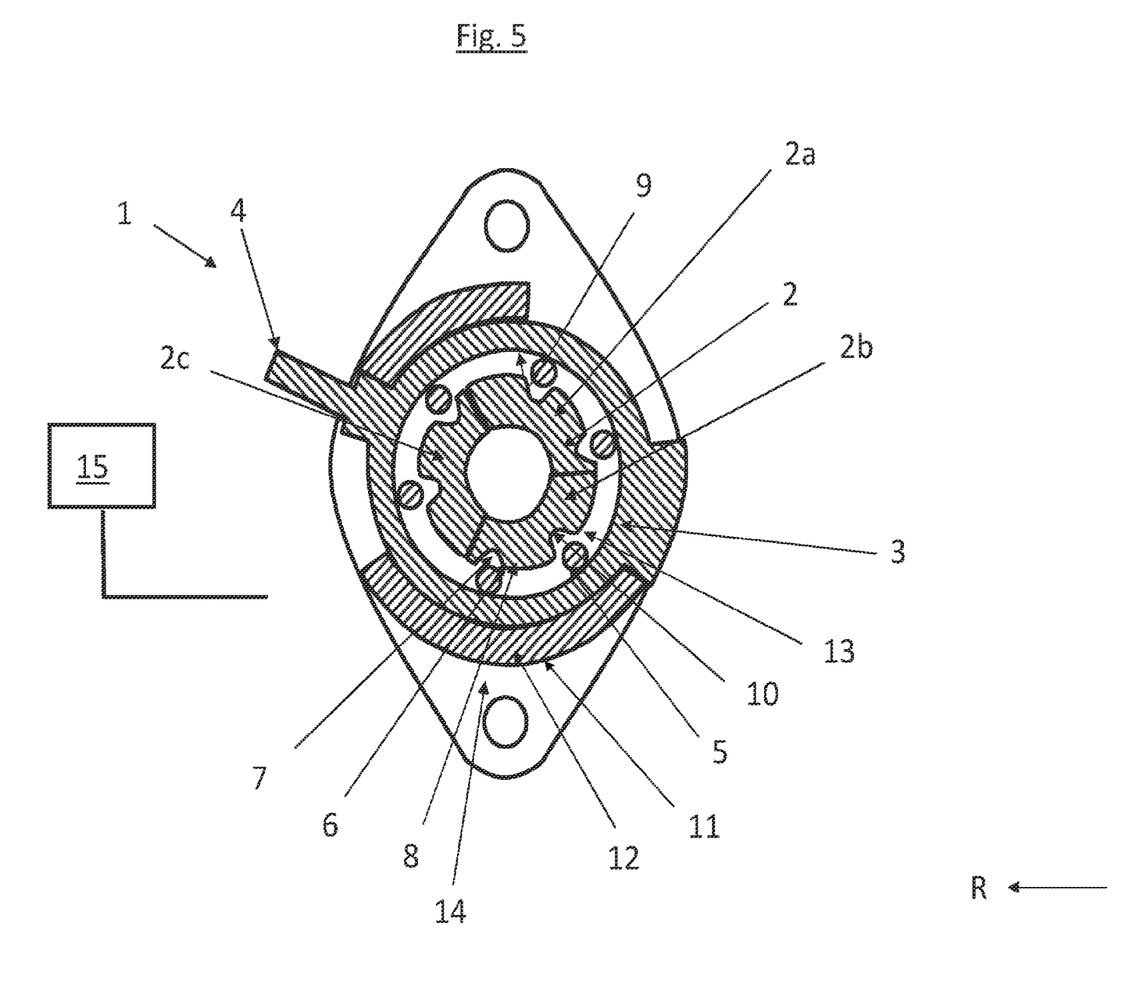

FIG. 5 schematically shows a cross-section along the line A-A in FIG. 1, where the separation device is in a releasing position. FIG. 5 shows a desired scenario where the bearing elements 5 follow the inner envelope surface 9 of the locking device 3 and where the nut portions 2a, 2b, 2c move in the radial direction R. FIG. 4 shows the most desired scenario where the bearing elements 5 follow the inner envelope surface 9 of the locking device 3 and at the same time follows the locking surfaces 8 and curvature of the indentations 7. One advantage of the scenario shown in FIG. 4 is that the curvature of the indentations 7 and/or position of the indentations 7 with relation to the bearing elements 5 allows for a smooth transition avoiding shock peaks and may also allow for an uneven force distribution onto the nut portions reducing risk of jamming. This will be explained further with reference to FIG. 7.

Figure 6:
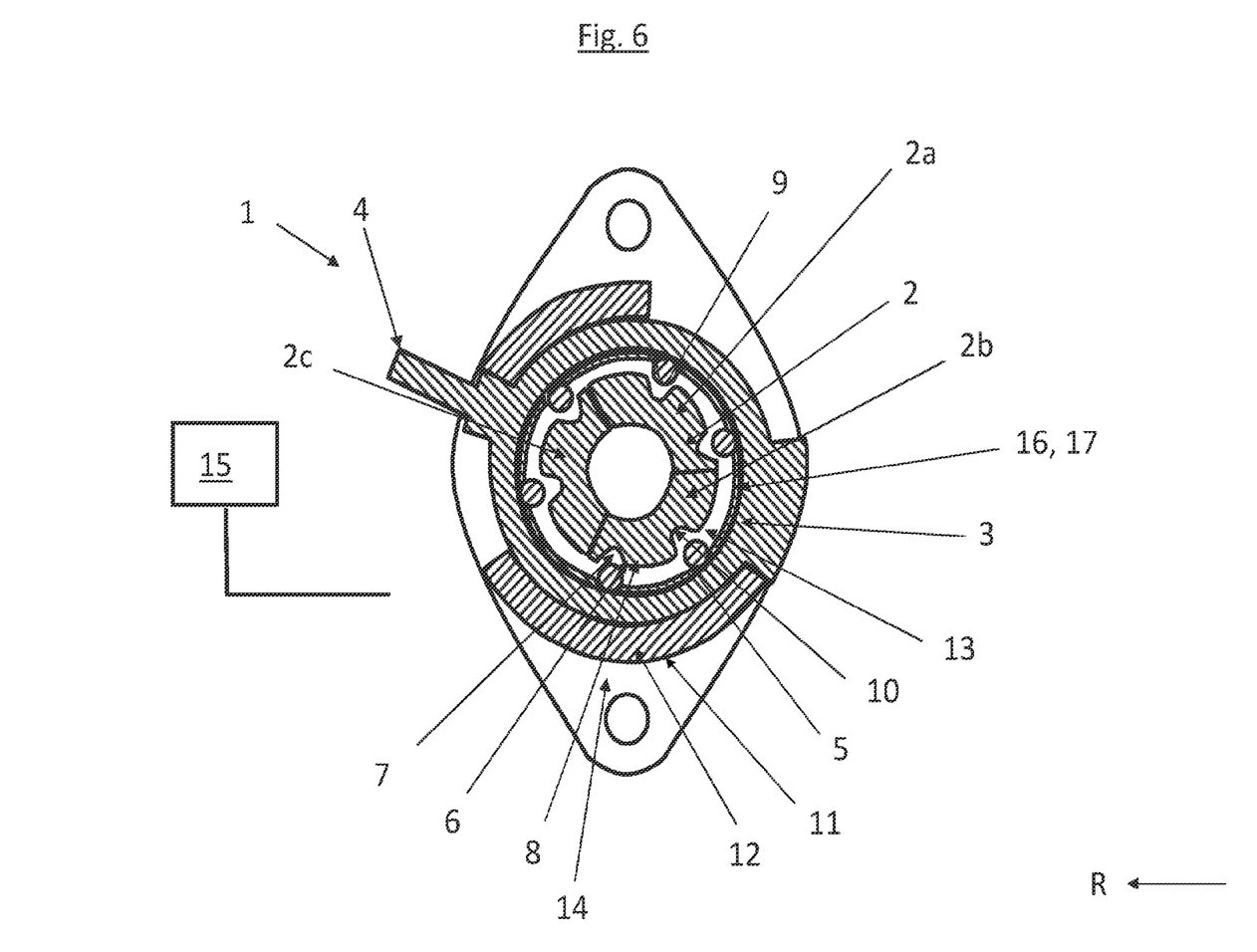
Figure 8:
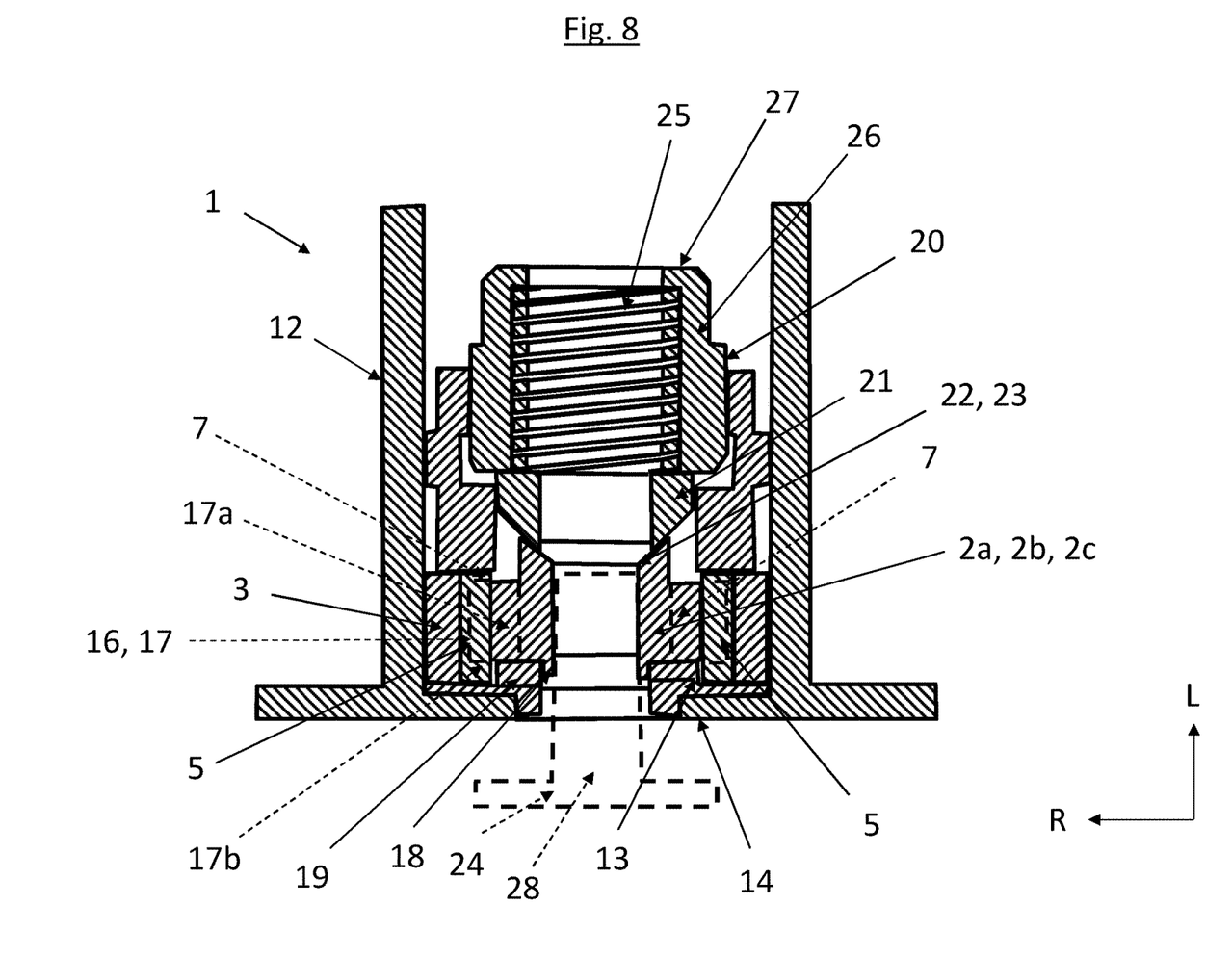
FIG. 8 schematically shows a cross-section along the line B-B in FIG. 1, where the separation device is in a locking position.

FIG. 6 schematically shows a cross-section along the line A-A in FIG. 1, where the separation device is in a releasing position. FIG. 6 shows that the bearing elements 5 are directly or indirectly stored in the locking device 3 such that the bearing elements 5 follow the rotational movement of the locking device 3. Here directly stored relates to that the locking device 3 comprises guiding means 16 that brings the bearing elements 5 along during movement of the locking device 3. Here, indirect relates to the a separate guiding means 16 is connected to the locking device 3 such that the bearing elements 5 are brought along during movement of the locking device. In both cases, the guiding means 16 comprises holding means 17 formed and arranged to move the bearing elements 5 with as little friction as possible. According to one example, the holding means comprises protrusions arranged in the radial direction with an extension being partly or entirely of the same length as the size of a cross-section of a bearing element (not shown). According to one example, the length of the protrusions exceed the radius of the bearing element which gives a pressure point against the bearing element in conjunction with a centrum axis of the bearing point (not shown). The advantage of such a centrally position pressure point is that the bearing elements is subject to a balanced force that follows the path of movement of the locking device. A protrusion being shorter than the radius of the bearing element is also possible but there is a risk of a force vector pointing in a counter radial direction, i.e. towards the centre of the nut, that may knock out the bearing element from the holding means. The protrusions can be straight or curved. A curved protrusion can be shaped to follow the curvature of the envelope surface of the bearing element. FIG. 8 shows further details of the guiding means 16 and holding means 17.

Figure 7:
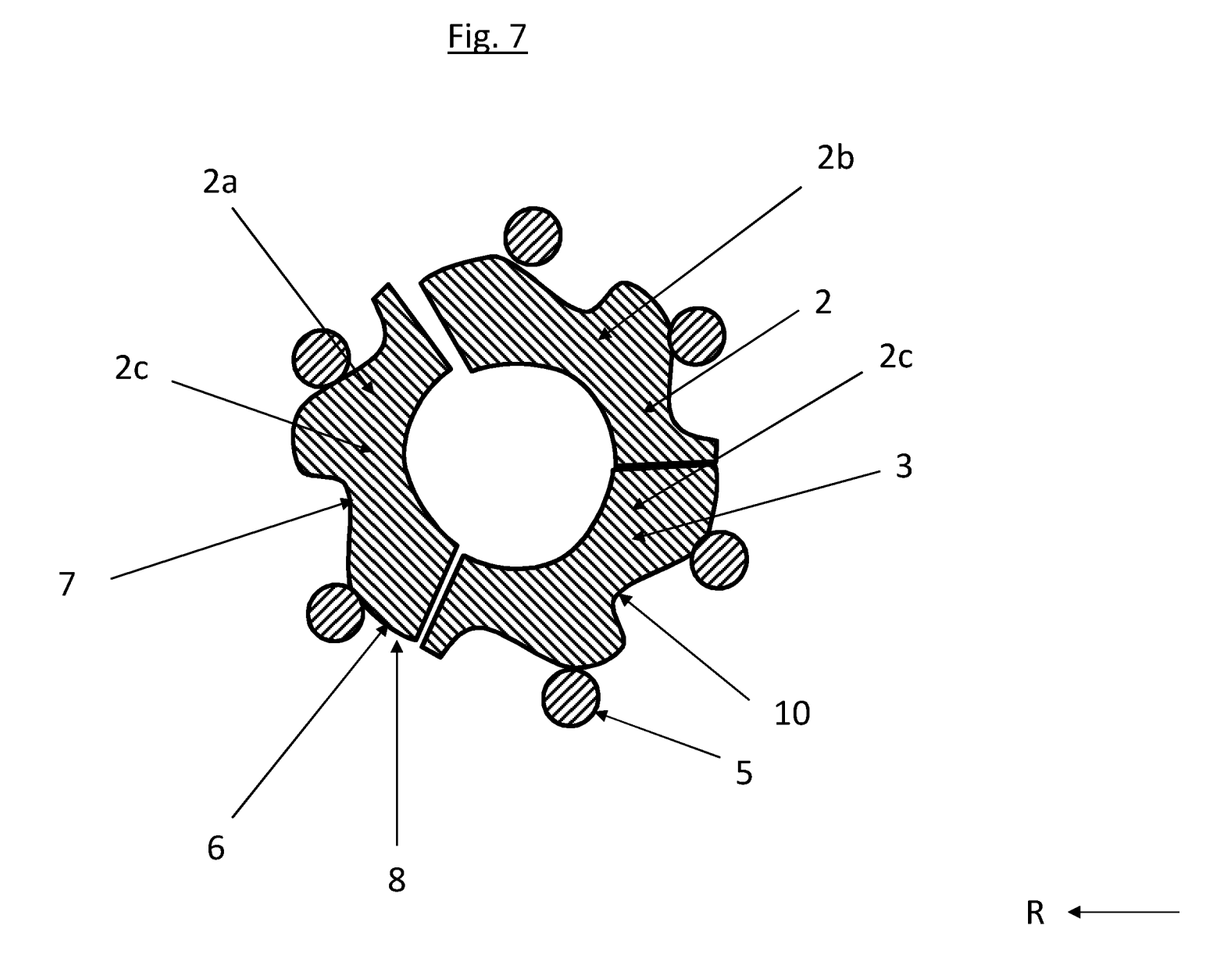

FIG. 7 schematically shows a cross-section of a nut and bearing elements along the line A-A in FIG. 1. FIG. 7 shows that the indentations 7 have a smooth curvature from the locking surface 8 to the bottom 10 of the indentation to attenuate a peak load when the separation device 1 is switched from the locked state to the released state.

The locking surfaces 8 are advantageously arranged such that the bearing elements 5 can apply a balanced pressure onto the nut 2, 2a, 2b, 2c from different directions. It should be noted that there are as many locking surfaces 8 as the number of bearing elements 5 and as many indentations 7 as bearing elements 5. In order to get the balanced pressure, the number of bearing elements should be at least an equal amount of bearing elements per locking surface and then at least one per locking surface. The bearing elements are advantageously positioned symmetrically around the nut to get a balanced pressure. For example, should the number of nut portions be two (not shown), then the number of locking surfaces is also at least two and the number of bearing elements is at least two positioned on either side of the nut and opposite each other. Should the number of bearing elements be more than two, then the bearing elements are positioned such that one bearing element on one locking surface has a counterpart bearing element on another locking surface. According to another example, shown in FIG. 7, then the nut comprises three nut portions and there are six bearing elements and six locking surfaces correspondingly. The six bearing elements is evenly distributed accordingly.

When the number of nut portions are odd as in FIGS. 1-8, then the balanced pressure can be achieved without the bearing elements being positioned opposite each other with reference to a centrum point of the nut if there is an even distribution of the bearing elements. When the number of nut portions are even, then the balanced pressure is achieved by bearing elements being positioned opposite each other with reference to the centrum point of the nut. If the number of bearing elements is one per locking surface, then the bearing element is positioned in the middle of the locking surface to get an even pressure of the nut portions towards each other. If the number of bearing elements is more than one per locking surface, then the bearing elements are positioned evenly distributed over the locking surface with relation to the middle of the locking surface to get an even pressure of the nut portions towards each other.

It should be noted that the nut portions can be equal in size or be different in size. The geometrical distribution of the bearing elements is dependent on number of nut portions, size of the nut portions and number of bearing elements and follow known rules of force geometry.

In the released state each bearing element is positioned facing the indentations thereby allowing movement of the nut portions in the radial direction.

FIG. 8 schematically shows a cross-section along the line B-B in FIG. 1, where the separation device is in a locking position. FIG. 8 shows that the separation device 1 comprises a housing 11 comprising an outer housing 12 in which the locking device 3 is stored for rotation.

The housing 11 comprises an inner housing 13 to which the nut 2 is connected for hindering rotation of the nut 2 relative the housing 11. The inner housing 13 is positioned within the outer housing 12 and attached to the outer housing 12 via an end plate 14.

The locking device 3 is rotatably arranged between the locking position and the releasing position within the outer housing 12 and about the inner housing 13.

The nut 2 is slidably stored in the inner housing 13 for allowing a slidable motion in a radial direction relative the inner housing 13. According to one example, the nut portions 2a, 2b, 2c comprise protrusions 18 and the end plate 14 comprises mating recesses or groves 19 in which the protrusions can slide. According to one example (not shown), the end plate comprises protrusions and at least two nut portions comprise mating recesses or groves in which the protrusions can slide. According to one example (not shown), the end plate comprises at least one protrusion and at least one recess/groove and at least one nut portion comprises a recess/grove that mates the protrusion and at least one nut portion comprises a protrusion that mates the recess/groove. Regardless of the above examples, there are as many protrusions as there are recesses/grooves. However, each the protrusion may comprise a number of spaced protrusions FIG. 8 shows that the separation device comprises an pressure device 20 to be stored in a locking position and move to a releasing position, when the separation device is switched from the locked state to the released state. When the separation device is used for securing a device, for example the payload, to another object, for example the dispenser body, then a fastening means, for example a bolt, is arranged within the nut. The nut is then arranged with threads to which the bolt are threaded into. The bolt then also has corresponding outer threads. When the separation device is switched from the locked state to the released state, the locking device moves from the locking position to the releasing position allowing for the at least two nut portions to separate.

FIG. 8 shows that the pressure device comprises wedge shaped portions 21 arranged in connection to the nut portions 2a, 2b, 2c. The wedge shaped portions 21 are arranged to move in the longitudinal direction L in order to apply pressure on the nut portions 2a, 2b, 2c in the releasing position such that the nut 2 is separated and the bolt 24 is released.

FIG. 8 shows that an upper portion 22 of the nut 2 comprises corresponding wedge shaped portions 23 to meet and interact with the wedge shaped portions 21 of the pressure device 20.

FIG. 8 shows a bolt 24 with broken lines to represent that the bolt 24 is an integral part of the separation device 1 when the separation device is mounted and in use. In FIG. 8, the pressure device comprises a casing 26 that houses the spring 25. FIG. 8 shows that the spring 25 is arranged between the flanges 27 and the wedge shaped portions 21 of the pressure device 20. Hence, in the releasing position the spring 25 puts pressure against the wedge shaped portions 21 of the pressure device 20 which in turn puts pressure against the wedge shaped portions 23 of the nut 2. One effect of this is aiding in separating the nut portions 2a, 2b, 2c. Another effect is that the nut portions 2a, 2b, 2c are held in place in the releasing position.

FIG. 8 schematically shows that the holding means 17 comprises upper holding means 17a and lower holding 17b means that encompasses the bearing elements 5 partly or entirely. This has the advantage that the bearing elements are kept in position regardless of if other portions of the guiding and holding means 16, 17 apply forces in a counter radial direction. According to this example, the bearing elements 5 have an extension in the longitudinal direction L being longer than that part of the nut portions 2a, 2b, 2c that comprises the indentations 7. Hence, the bearing elements 5 have a length in the longitudinal direction L being at least the length of that part of the nut portions 2a, 2b, 2c that comprises the indentations 7 plus the length of the upper and lower holding means 17a, 17b. The upper holding means 17a and lower holding means 17b that encompasses the bearing elements 5 partly or entirely would otherwise hinder the radial movement of the nut portions. That portion of the guiding and holding means 16, 17 between the upper holding means and lower holding means advantageously has as little extension as possible in the radial direction R in order to allow movement of the nut portions 2a, 2b, 2c such that the indentations 7 can receive the bearing elements 5 without interference of the guiding and holding means 16, 17. It should be noted that the nut 2 has portions not comprising indentations, and those portions can have a length in the longitudinal direction L exceeding that part of the nut portions 2a, 2b, 2c that comprises the indentations 7. For example, the nut portions 2a, 2b, 2c may comprise the protrusions 18 that can be used for allowing a controlled sliding of the nut portions 2a, 2b, 2c in the radial direction R. According to another example, the nut portions 2a, 2b, 2c may comprise the wedge shaped portions 23 used to hold the nut portions 2a, 2b, 2c in place in the released portion.

It should be noted that the bolt 24 could be pre-loaded by a spring or any other means that aids in ejecting the bolt from the nut in the releasing position (not shown).

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A separation device for a spacecraft or launcher, the separation device comprising:
a nut divided into at least two nut portions locked to each other by a locking device in a locking position, the locking device being arranged to move relative the nut between the locking position and a releasing position, the separation device comprising a releasing device directly connected to the locking device, the releasing device being arranged to switch the locking device from the locking position to the releasing position when the separation device is switched from a locked state to a released state,
wherein the separation device comprises at least two bearing elements arranged between the locking device and the nut, wherein the bearing elements follow rotational movement of the locking device, wherein the nut comprises an outer envelope surface, wherein the outer envelope surface comprises as many indentations as the number of bearing elements and locking surfaces between the indentations, wherein in the locked state each bearing element is jammed between the locking surface and an inner envelope surface of the locking device hindering movement of the nut portions in a radial direction, wherein in the released state each bearing element is positioned facing the indentations thereby allowing movement of the nut portions in the radial direction, and wherein the releasing device is adapted to switch the locking device from the locking position to the releasing position via rotation of the locking device.

2. The separation device according to claim 1, wherein the bearing elements are in the form of cylindrical elements and/or spherical elements.

3. The separation device according to claim 1, wherein the indentations have a smooth curvature from the locking surface to a bottom of the indentation to attenuate a peak load when the separation device is switched from the locked state to the released state.

4. The separation device according to claim 3, wherein the indentations comprising a first indentation having a different radius than a second indentation.

5. The separation device according to claim 1, wherein the separation device comprises a housing comprising an outer housing, and wherein the locking device is stored in the outer housing for rotation.

6. The separation device according to claim 5, wherein the housing comprises an inner housing, the nut is connected to the inner housing for hindering rotation of the nut relative the housing, and wherein the inner housing is positioned within the outer housing and attached to the outer housing via an end plate.

7. The separation device according to claim 6, wherein the nut is slidably stored in the inner housing for allowing a slidable motion in a radial direction relative the inner housing.

8. The separation device according to claim 6, wherein the locking device is rotatably arranged between the locking position and the releasing position within the outer housing and about the inner housing.

9. The separation device according to claim 1, wherein the bearing elements are directly or indirectly stored in the locking device such that the bearing elements follow a rotational movement of the locking device.

10. The separation device according to claim 1, wherein the separation device comprises a control unit arranged to control the releasing device.

11. The separation device according to claim 1, wherein the separation device comprises a pressure device comprising a spring that transfers energy to the nut so that the nut portions are held in place in the released state.

12. The separation device according to claim 11, wherein the pressure device comprises wedge shaped portions arranged in connection to the nut portions, being arranged to move in the longitudinal direction (L) in order to apply pressure on the nut portions in the releasing position such that the nut is separated.

13. The separation device according to claim 12, wherein the nut comprises an upper portion comprising corresponding wedge shaped portions to meet and interact with the wedge shaped portions of the pressure device.

14. The separation device according to claim 11, wherein the pressure device comprises a spring that is pre-loaded and connected to wedge shaped portions of the pressure device, wherein the spring applies pressure onto the wedge shaped portions of the pressure device during releasing position.

15. A separation device for a spacecraft or launcher, the separation device comprising:
a nut divided into at least two nut portions locked to each other by a locking device in a locking position, the locking device being arranged to move relative the nut between the locking position and a releasing position, the separation device comprising a releasing device connected to the locking device, the releasing device being arranged to switch the locking device from the locking position to the releasing position when the separation device is switched from a locked state to a released state,
wherein the separation device comprises at least two bearing elements arranged between the locking device and the nut, wherein the bearing elements follow rotational movement of the locking device, wherein the nut comprises an outer envelope surface, wherein the outer envelope surface comprises as many indentations as the number of bearing elements and locking surfaces between the indentations, wherein in the locked state each bearing element is jammed between the locking surface and an inner envelope surface of the locking device hindering movement of the nut portions in a radial direction, wherein in the released state each bearing element is positioned facing the indentations thereby allowing movement of the nut portions in the radial direction, wherein the releasing device is adapted to switch the locking device from the locking position to the releasing position via rotation of the locking device, and wherein the indentations have a smooth curvature from the locking surface to a bottom of the indentation to attenuate a peak load when the separation device is switched from the locked state to the released state.

* * * * *